United States Patent Office
3,491,109
Patented Jan. 20, 1970

3,491,109
3,5-DIOXO-1,2,4-THIADIAZOLIDINES
Gerhard Zumach and Ludwig Eue, Cologne-Stammheim, Germany, Wolfgang Weiss, Filago, Marne, Italy, Engelbert Kühle, Bergisch Gladbach, and Helmuth Hack, Cologne-Buchheim, Germany, assignors to Farbenfabriken Bayer Aktiengesellschaft, Leverkusen, Germany, a corporation of Germany
No Drawing. Filed Dec. 22, 1967, Ser. No. 692,684
Claims priority, application Germany, Jan. 27, 1967, F 51,360
Int. Cl. C07d 91/60; A01n 9/12
U.S. Cl. 260—306.7       9 Claims

ABSTRACT OF THE DISCLOSURE 2-(trifluoromethyl, and optionally chloro, -substituted phenyl) - 4 - alkyl - 3,5 - dioxo - 1,2,4 - thiadiazolidines which possess herbicidal properties, and which may be produced by conventional methods.

---

The present invention relates to and has for its objects the provision for particular new thiadiazolidines which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is known that imidazolidines, such as the imidazolidine of the formula

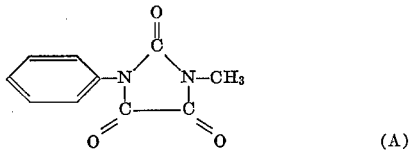

can be used as herbicidally active compounds (cf. U.S. Patent 2,895,817).

It has now been found, in accordance with the present invention, that the particular new thiadiazolidines, i.e. 2-(trifluoromethyl, and optionally chloro, -substituted phenyl) - 4 - alkyl - 3,5 - dioxo - 1,2,4 - thiadiazolidines, having the general formula

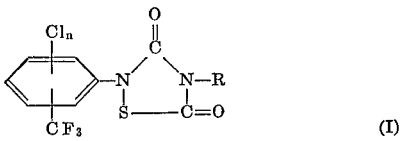

in which R is selected from the group consisting of alkyl having 1-4 carbon atoms, and halo-substituted alkyl having 1-4 carbon atoms, and $n$ is a whole number from 0 to 1, exhibit strong herbicidal, in particular selective herbicidal, properties.

It has been furthermore found, in accordance with the present invention, that a versatile and smooth process for the production of the particular new thiadiazolidines of Formula I above in favorable yields may be provided, which comprises reacting a urea derivative having the formula

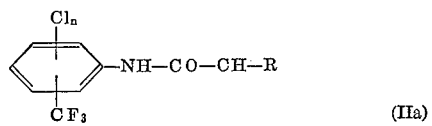

in which R and $n$ are the same as defined above with chlorocarbonylsulphenyl chloride (IIb), optionally in the presence of a solvent.

Surprisingly, the thiadiazolidines of the instant invention show a higher herbicidal, in particular selective herbicidal, activity than the imidazolidines known from the prior art which are chemically the closest active compounds of the same type of activity. The active compounds of the present invention therefore represent an enrichment of the art.

If for instance chlorocarbonylsulphenyl chloride (IIb) and 1-(4′-trifluoromethylphenyl)-3-methylurea (IIaa) are used as starting materials, the course of the reaction can be represented by the following equation:

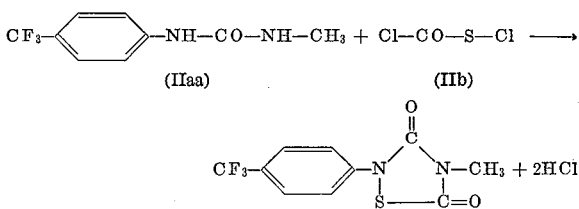

The types of urea derivatives usable in accordance with the process of the present invention are clearly characterized by the Formula IIa stated above.

As examples of such urea derivatives which can be used according to the present invention, there may be mentioned in particular:

1-(4′-trifluoromethyl-phenyl)-3-methylurea
1-(4′-trifluoromethyl-phenyl)-3-ethylurea
1-(4′-trifluoromethyl-phenyl)-3-isopropylurea
1-(3′-trifluoromethyl-phenyl)-3-methylurea
1-(3′-trifluoromethyl-phenyl)-3-n-propylurea
1-(3′-chloro-4′-trifluoromethyl-phenyl)-3-methylurea
1-(3′-chloro-4′-trifluoromethyl-phenyl)-3-(2″-bromoethyl)-urea
1-(3′-chloro-4′-trifluoromethyl-phenyl)-n-butylurea
1-(2′-chloro-4′-trifluoromethyl-phenyl)-3-methylurea
1-(2′-chloro-4′-trifluoromethyl-phenyl)-3-isobutylurea The reaction is carried out preferably in the presence of a solvent. Preferred solvents are those which do not react with, or react only slowly with, chlorocarbonylsulphenyl chloride. Examples of such solvents include hydrocarbons, such as benzine, hexane, benzene, toluene; chlorinated hydrocarbons, such as methylene chloride, dichloroethane, chloroform, carbon tetrachloride, chlorobenzene, dichlorobenzene; ethers, such as tetrahydrofuran, dibutyl ether, dioxan; esters, such as ethyl acetate; and the like; and any desired mixtures of these solvents.

The reaction temperature can be varied within a wide range. In general, the reaction is carried out at substantially between about 20 to 150° C., preferably between about 50 to 80° C.

In general, the reactants are used in approximately equimolar proportions. The reaction can for example be carried out in such a manner that the chlorocarbonylsulphenyl chloride is added dropwise to a solution or suspension of the urea derivative at 60–80° C., and the reaction mixture is kept at this temperature until the splitting off of hydrogen chloride has ended.

After completion of the reaction, evaporation in a vacuum may be effected. The residue (which is most cases is crystalline) may be stirred together with warm methanol and the solid substance filtered off. The corresponding thiadiazolidines may in this way be obtained in pure form.

The 3,5-dioxo-1,2,4-thiadiazolidines of the instant invention exhibit strong herbicidal properties. They can therefore be used for the destruction of plants. Since their herbicidal effectivness varies greatly with different plants, they can also be used as selective herbicides.

Thus, the instant compounds can be used for the control of weeds in the cultivation of crops, such as wheat, oats, maize, cotton or carrots. The term weeds is here used in the widest sent to mean plants which grow in cultivations or in places where they are not desired. Particularly well susceptible of control are: Sinapis, Galinsoga, Stellaria, Urtica, Matricaria, Daucus, Pastinaca, Echinochloa, and the like.

The active compounds according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and water; as well as finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

Such active compounds may be employed alone or in the form of mixtures with one another and/or with such solid or liquid dispersible carrier vehicles and/or with other known compatible active agents, especially plant protection agents, such as other herbicides, such as phenoxycarboxylic acids, nitrated phenols, ureas, uracils, triazoles, triazines, carbamates, etc., fungicides, insecticides, bactericides, etc., if desired, or in the form of particular dosage preparations for specific application made therefrom, such as solutions, emulsions, suspension, powders, pastes, and granulates which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.01–2.0% preferably 0.01–0.8%, by weight of the mixture. Thus, the present invention contemplates overall compositions which comprise mixtures of a dispersible carrier vehicle such as (1) a dispersible carrier solid, or (2) a dispersible carrier liquid preferably including a carrier vehicle assistant, e.g. surface-active agent, and an amount of the active compound which is effective for the purpose in question and which is generally between about 0.01–95% by weight of the mixture.

While the active compounds can be used according to the pre-emergence method, they are particularly effective when used according to the post-emergence method.

When the active compounds are used as total herbicides, the content of active compound in the composition mixture actually applied is, in general, substantially between about 0.1–2%, and preferably between about 0.2–0.8%, by weight of the mixture. On the other hand, when the active compounds are used as selective herbicides, the content of the active compound in the mixture is, in general, substantially between about 0.01–0.2%, and preferably between about 0.03–0.1%, by weight of the mixture.

Furthermore, the present invention contemplates methods of selectively controlling or combating undesired plants, e.g. weeds and the like, which comprise applying to at least one of (a) such weeds and (b) their habitat, i.e. the locus to be protected, a herbicidally effective amount of the particular active compound of the invention alone or together with a carrier vehicle as noted above. The instant formulations or compositions are applied in the usual manner, for example, by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, and the plants which are to be controlled and/or protected. Therefore, in special cases, it is possible to go above or below the aforementioned concentration ranges.

The following examples illustrate, without limitation, the herbicidal activity of the particular active compounds of the present invention.

EXAMPLE 1

Post-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is then added and the resulting concentrate is diluted with water to the desired final concentration.

Test plants which have a height of about 5–15 cm. are sprayed with the preparation of the given active compound until just dew moist. After three weeks, the degree of damage to the plants is determined and characterized by the values 0–5, which have the following meaning:

0—no effect
1—a few slightly burnt spots
2—marked damage to leaves
3—some leaves and parts of stalks partially dead
4—plant partially destroyed
5—plant completely dead.

The particular active compounds tested, their concentrations and the results obtained can be seen from the following Table 1:

4—plants partially destroyed after germination or only 25% emerged
5—plants completely dead or not emerged.

TABLE 1.—POST-EMERGENCE TEST

| Active compound | Concentration of active compound in percent | Echinochloa | Chenopodium | Sinapis | Galin soga | Stellaria | Urtica | Matricaria | Cotton | Carrots |
|---|---|---|---|---|---|---|---|---|---|---|
| (A) (known) | 0.1 | 4-5 | 3 | 5 | 4-5 | 5 | 5 | 4 | 1 | 4 |
|  | 0.05 | 3 | 2 | 5 | 2 | 4-5 | 2 | 3 | 0 | 2 |
| (IV$_1$) | 0.1 | 5 | 5 | 5 | 5 | 5 | 5 | 5 | 4 | 5 |
|  | 0.05 | 5 | 5 | 5 | 5 | 5 | 5 | 5 | 3 | 5 |
| (III$_2$) | 0.1 | 4-5 | 5 | 5 | 5 | 5 | 5 | 4 | 1 | 1 |
|  | 0.05 | 3 | 5 | 4-5 | 5 | 5 | 3-4 | 3 | 0 | 0 |

EXAMPLE 2

Pre-emergence test
Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is then added and the resulting concentrate is then diluted with water to the desired final concentration.

Seeds of the test plants are sown in normal soil and, after 24 hours, watered with the preparation of the given active compound. It is expedient to keep constant the amount of water per unit area. The concentration of the active compound in the preparation is of no importance, only the amount of active compound applied per unit area being decisive. After three weeks, the degree of damage to the test plants is determined and characterized by the values 0–5, which have the following meaning:

0—no effect
1—slight damage or delay in growth
2—marked damage or inhibition of growth
3—heavy damage and only deficient development or only 50% emerged The particular active compounds tested, the amounts thereof applied and the results obtained can be seen from the following Table 2:

TABLE 2.—PRE-EMERGENCE TEST

| Active compound | Active compound used, kg./hectare | Chenopodium | Sinapis | Oats | Wheat |
|---|---|---|---|---|---|
| (A) | 10 | 4-5 | 5 | 4 | 4 |
|  | 5 | 4-5 | 5 | 3 | 3 |
|  | 2.5 | 2 | 5 | 2 | 1 |
| (IV$_2$) | 10 | 5 | 5 | 2 | 1 |
|  | 5 | 5 | 5 | 1 | 0 |
|  | 2.5 | 5 | 4 | 0 | 0 |

The process for producing the instant new compounds according to the invention is illustrated without limitation by the following further examples.

EXAMPLE 3

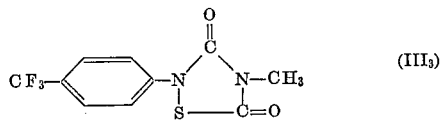

(III$_3$)

22 g. of 1-(4'-trifluoromethyl-phenyl) - 3 - methylurea (0.1 mol) are suspended in 200 cc. of benzene. 14 g. of chlorocarbonylsulphenyl chloride (10% excess) are added dropwise and heating to the boil is effected until the evolution of hydrogen chloride has ceased (about 7 hours). This is followed by evaporation in a vacuum and recrystallization of the residue from methanol. 16 g. (58% of the theory) of 2-(4'-trifluoromethylphenyl)-4-methyl-3,5-dioxo-1,2,4-thiadiazolidines are obtained; M.P.: 154° C.

The following compounds are prepared in analogous manner:

| | M.P., °C |
|---|---|
| (V₁) [structure: CF₃-phenyl-N(S-C=O)(N-CH₃)C=O] | 149 |
| (IV₃) [structure: Cl, CF₃-phenyl-N(S-C=O)(N-CH₃)C=O] | 109–110 |
| (VI₁) [structure: Cl, CF₃-phenyl-N(S-C=O)(N-CH₃)C=O] | 138–139 |
| (VII₁) [structure: CF₃-phenyl-N(S-C=O)(N-C₃H₇-n)C=O] | 116–118 |
| (VIII₁) [structure: Cl, CF₃-phenyl-N(S-C=O)(N-CH₂-CH₂-Br)C=O] | Oil |
| (IX₁) [structure: Cl, CF₃-phenyl-N(S-CO)(N-CH(CH₃)₂)C=O] | 103 |

EXAMPLE 4

Using corresponding molar amounts of chlorocarbonyl-sulfenyl chloride and 1-(2'-trifluoromethyl-4'-chloro-phenyl)-3-(3''-chloro-2''-methyl-propyl)-urea in accordance with the procedure of Example 3, the compound 2-(2'-trifluoromethyl-4'-chloro-phenyl)-4-(3''-chloro-2''-methyl-propyl)-3,5-dioxo-1,2,4-thiadiazolidines is formed.

Advantageously, in accordance with the present invention, in the foregoing formulae:

R represents alkyl hydrocarbon having 1–4 carbon atoms, such as methyl, ethyl, n-propyl, isopropyl, n-butyl, isobutyl, sec.-butyl, tert.butyl, and the like, especially methyl, ethyl, n- and iso-propyl, and n- and iso-butyl; and halo-substituted alkyl hydrocarbon having 1–4 carbon atoms, as defined above for R such as mono, di, and poly chloro, bromo, fluoro and/or iodo substituted methyl to tert.-butyl inclusive, especially chloro and bromo $C_{1-4}$ alkyl, and particularly bromo $C_{1-4}$ alkyl; and $n$ is a whole number having a value from 0 to 1.

In particular, R is $C_{1-4}$ alkyl, or bromo $C_{1-4}$ alkyl, $n$ is 0 or 1, and the 2-position phenyl moiety is substituted with trifluoromethyl preferably in the 3- or 4-position (i.e. metal or para) and with chloro preferably in the 2- or 3-position (i.e. ortho or meta) when $n=1$.

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained whenu sed in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:

1. Thiadiazolidine having the formula

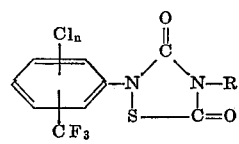

in which R is selected from the group consisting of alkyl having 1–4 carbon atoms and halo-substituted alkyl having 1–4 carbon atoms, and $n$ is a whole number from 0 to 1.

2. Thiadiazolidines according to claim 1 wherein R is selected from the group consisting of $C_{1-4}$ alkyl and bromo $C_{1-4}$ alkyl, and $n$ is 0 to 1.

3. Thiadiazolidines according to claim 1 wherein such compound is 2-(4'-trifluoromethyl-phenyl)-4-methyl-3,5-dioxo-1,2,4-thiadiazolidine having the formula

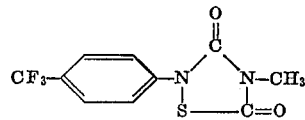

4. Thiadiazolidines according to claim 1 wherein such compound is 2-(3'-chloro-4'-trifluoromethyl-phenyl)-4-methyl-3,5-dioxo-1,2,4-thiadiazolidine having the formula

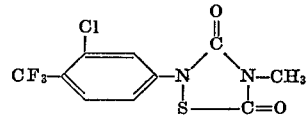

5. Thiadiazolidines according to claim 1 wherein such compound is 2-(3'-trifluoromethyl-phenyl)-4-methyl-3,5-dioxo-1,2,4-thiadiazolidine having the formula

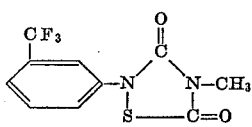

6. Thiadiazolidines according to claim 1 wherein such compound is 2-(2'-chloro-4'-trifluoromethyl-phenyl)-4-methyl-3,5-dioxo-1,2,4-thiadiazolidine having the formula

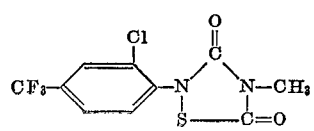

7. Thiadiazolidines according to claim 1 wherein such compound is 2 - (4' - trifluoromethyl-phenyl)-4-n-propyl-3,5-dioxo-1,2,4-thiadiazolidine having the formula

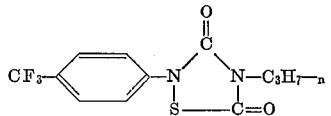

8. Thiadiazolidines according to claim 1 wherein such compound is 2-(3'-chloro - 4' - trifluoromethyl-phenyl)-4-(2" - bromoethyl)-3,5-dioxo-1,2,4-thiadiazolidine having the formula

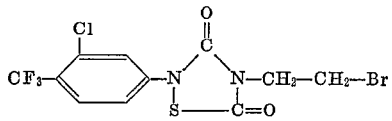

9. Thiadiazolidines according to claim 1 wherein such compound is 2-(3'-chloro - 4' - trifluoromethyl-phenyl)-4-isopropyl-3,5-dioxo-1,2,4-thiadiazolidine having the formula

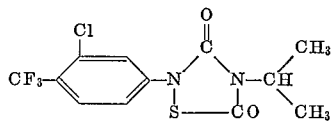

References Cited
UNITED STATES PATENTS 3,374,240  3/1968  Ottmann et al. _____ 260—306.7

ALEX MAZEL, Primary Examiner

R. J. GALLAGHER, Assistant Examiner

U.S. Cl. X.R.

71—90, 92; 260—553